Sept. 7, 1943.  A. WEIL  2,328,590
ROACH RUN
Filed April 26, 1941
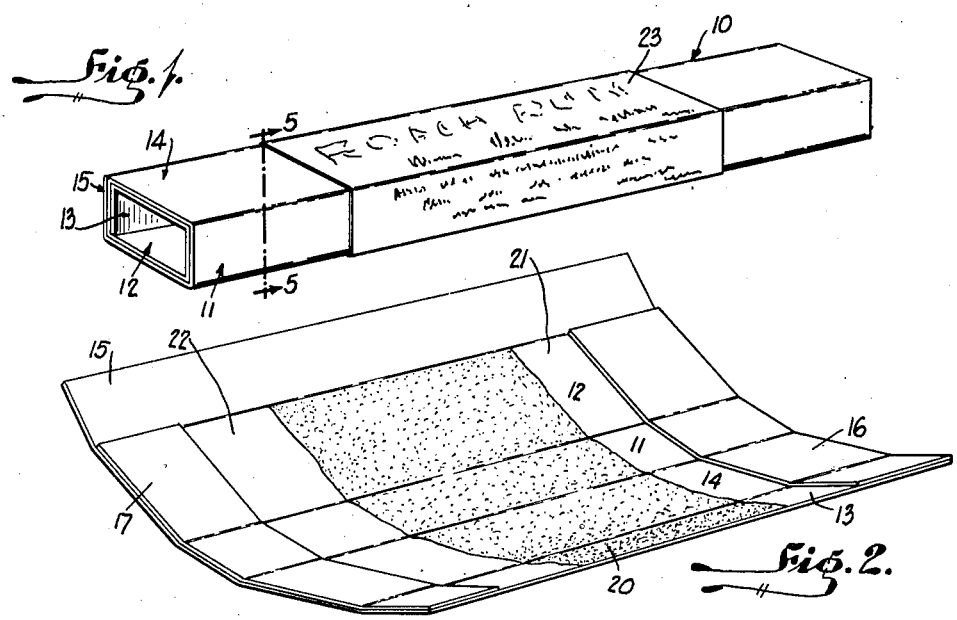
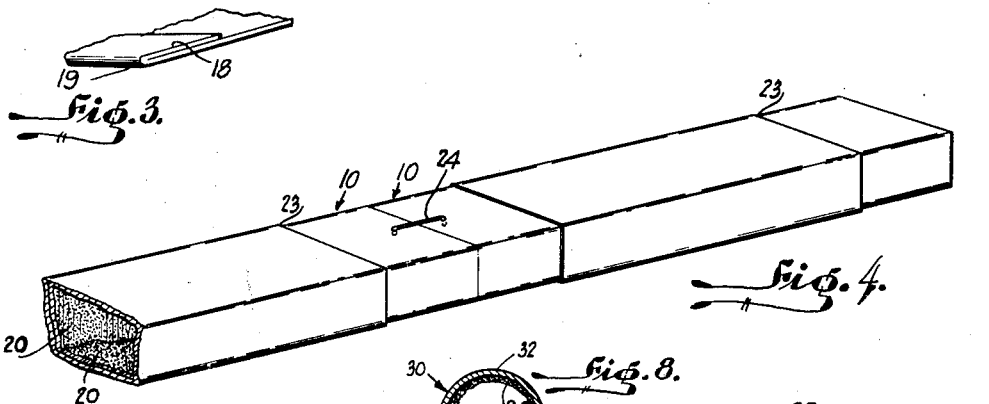
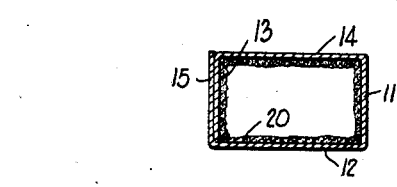
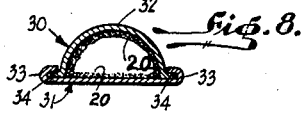
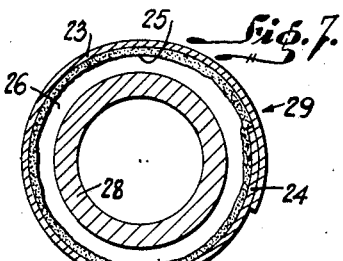
INVENTOR.
Alex Weil Patented Sept. 7, 1943

2,328,590

UNITED STATES PATENT OFFICE 2,328,590

ROACH RUN

Alex Weil, Jamaica, N. Y.

Application April 26, 1941, Serial No. 390,449

5 Claims. (Cl. 43—131)

This invention relates to devices for roach control and extermination and it has especial reference to a device for attracting vermin like roaches and within which may be contained a poisonous substance for the extermination of roaches.

Experts in the insect exterminating industry have conducted numerous experiments, and it has been clearly established that roaches instinctively seek out as hiding places crevices in walls, spaces between shelves and walls, crevices formed by joints of boards, drawers, filing cabinets, etc. Applicant who has been intensively engaged in these experiments, has drawn and proved the conclusion that a suitably constructed container, preferably one having a dark interior, left deliberately or otherwise in a place infested with roaches and permitted to remain there untouched for some time, will draw roaches and cause them to use it as a hiding place.

With this in view, it is a principal object of this invention to provide, as an article of manufacture, an artificial hiding place or run for roaches which, by its very construction, will be an irresistable attraction for roaches, and to combine with this artificial hiding place or run, means for safely retaining a deposit of a suitable poison food lure for roaches.

A further aim of the present invention lies in the provision of a roach run which will induce roaches to hide therein, and means within the roach run to cause the death of roaches who have hidden in said roach run.

A still further aim of the present invention resides in the provision of a roach trap the interior of which is adapted to contain a poisoned substance, the trap being so constructed that the poisoned substance will not spread to the exterior of the run, so that it cannot be inadvertently contacted by human beings or animals.

Yet another purpose of the present invention lies in overcoming various of the disadvantages of and in improving upon, the now common method of roach extermination, which consists in placing a poisoned food article (potato) about a premises, or applying highly poisonous sodium fluoride or other powder about a premises.

These and many other meritorious objects and advantages are achieved by the novel construction and arrangement of parts hereinafter described and illustrated in the accompanying drawing, forming a material component of this disclosure, and in which:

Figure 1 is a perspective view of a roach run constructed in accordance with this invention and illustrated in assembled condition, ready for use.

Figure 2 illustrates a blank from which a roach run may be formed.

Figure 3 is a partial detail view of a modified form of construction of a safety terminal used in connection with this invention.

Figure 4 illustrates in perspective how two or more roach runs may be joined together lengthwise to increase the length of the run.

Figure 5 is a sectional view, the section being taken on line 5—5 of Figure 1.

Figure 6 is a sectional view through a modified form of roach run.

Figure 7 is a cross-section of another modified form of roach run, showing the device encircling a pipe, such as a water or steam pipe.

Figure 8 is a sectional view of still another modified form of this invention.

Referring in greater detail to Figures 1 and 2 of the drawing, the numeral 10 designates in general a roach run which comprises preferably a substantially rectangular blank conformed to provide a tube-like housing which, as appears from Figure 1, is preferably of considerably length in comparison to its cross-sectional dimensions. This blank may be provided throughout its length with crease-lines by means of which the said blank may be divided into five panels 11, 12, 13, 14 and 15. Panel members 16 and 17 of much shorter length than the blank overlie the end portions of the inner faces of the panels of the blank, as shown in Figure 2, may be glued or otherwise secured to the panels 11, 12, 13 and 14. The panel members 16 and 17 extend from the outer edges of the panels to a predetermined point inwardly, as is illustrated in Figure 2 of the drawing. As illustrated at 18 in Figure 3, the panel members may also be formed by bending the ends of the blank inwardly upon the panels, as indicated at 19, and in this form also, panel 15 remains without such provision, the same being cut away so that panel 15 will present a smooth inner surface.

Paste 20 or any other desirable poisonous roach food is spread over preferably the entire width of four of the five panels of the blank at the inner face thereof in such a manner that these double wall terminal portions adjacent each end of the blank remain without the said material, and in addition thereto there is also provided an additional uncoated space as will be seen in Figure 2 at 21 and 22, one adjacent each end of the coated central area of the blank.

Where the tube-like housing is to be given a rectangular cross-section, a blank constructed as above described and hence subdivided into five longitudinal panels and having the auxiliary panel members overlying the inner faces of four of the longitudinal panels of the blank, is folded about the fold lines sub-dividing the blank into the longitudinal panels and correspondingly subdividing the end or terminal panel members, all as shown in Figure 2, bringing panel 15 into external overlapping relation to panel 13 against which it is secured in any suitable way as is later described. The central areas of the internal faces of the four walls thus bear the poisonous layer of material 20, but the end boundary lines or edges of the layer 20 will be seen to be substantially spaced inwardly from the open ends of the housing 10 and moreover will be seen to be spaced also considerably inwardly from the inner edges of the panel members 16—17 of Figure 2 or 18 of Figure 3, this latter spacing being on the order of that indicated at 21 and 22 in Figure 2. The uncoated areas 21 and 22 must, therefore, be first traversed by any flow of the material 20, these areas acting to retard material flow due to the spreading out thereon of the material in the event that it does partake of flow. Thus chance of contamination of the inner faces of the end or auxiliary panel members 16—17 is lessened, while the end edges of these safety or terminal panel members 16—17 of Figure 2 or 18 of Figure 3 present ridges or additional barriers, like dams, to tend to divert laterally or transversely of the panels 11, 12, 13 and 14 further flow of the paste-like material 20, thus causing it to spread itself more widely over the theretofore uncoated faces of these four panels.

If it is desired to increase the length of the roach run, two or more runs may be joined lengthwise by staples or in any other desirable manner, as at 24. By the use of this arrangement, the individual runway may be converted to a runway which will immeasurably increase the trap capacity of single units and to aid in the control of aggravated roach problems.

As shown in Figure 6, the tubular device of other cross-sectional forms, for example, cylindrical, by the use of a blank without any longitudinal crease-lines in which event the blank may be rolled to form a cylinder instead of being bent to form a rectangular housing, the cylinder being provided with safety terminals at each end as above described.

Another modification is illustrated in Figure 7, wherein a cylindrical roach run 29 encircles a pipe 28 such as a water pipe or a steam pipe, the encirclement being such that space 26 is provided between pipe 28 and run 29, the device being provided with safety terminals, as heretofore described.

A still further modification is illustrated in Figure 8 wherein the roach run consists of a metallic base 31 comprising a relatively long, narrow strip curved upwardly and inwardly upon itself as at 33 throughout its length to form longitudinally extending recesses or guideways, one at each side of the strip and in which are slidably retained the flange-like members 34 of a cover member 30, its upper or central portion being curved as at 32 to form with the base 31 a housing or roach run; this modified form too being provided with safety terminals, one at each end, and being coated intermediate of the safety terminals with the poisonous paste-like material 20, the latter being preferably applied to both members of the housing.

The device operates as follows: The runs are placed throughout roach infested premises wherever the user believes them to be of most value. Instinctively in a very short time, and in part due to the relatively dark interior, roaches will seek out these runs as hiding places, and will enter them. When passing the poisoned surface in the interior of the run, they will either eat the food or absorb by contact a sufficient amount of the poison to ultimately cause their death. It will be noted that, should the paste become soft and spread due to heat or other causes it will be prevented from spreading to the outside of the run by its being thinned out in spreading over or onto the areas 21 and 22 and the ridge near each end thereof, as earlier above described.

The modified form illustrated in Figure 8 differs in that it is made of two pieces, a flat base and a rounded upper portion which is slidably retained in the base and which may be removed for cleaning purposes. In all of the several forms however, safety terminals and ridges are present.

When it is desired to assemble a roach run other than that illustrated in Figure 8, the blank is folded along its crease lines after having been properly coated with a poisonous roach food. It is folded in such manner that panel 15 will overlap panel 13 at the outside thereof, panel 15 is then stapled or glued to panel 13 and a gummed label 23 is secured around the entire device which will retain it in its assembled position. The cylindrical type of run is assembled in a similar manner, except that it is rolled instead of being bent or folded. Here too, one longitudinal edge portion overlaps the other and the device is retained in its assembled condition by a gummed label. Obviously, the device may have a shape other than rectangular or cylindrical.

It will be seen that there has been illustrated and described a roach run of simple construction, yet extremely effective in its use and, it is to be understood that this disclosure is to be regarded as illustrative and descriptive of the several forms only and not as restrictive to the exact construction shown, since changes may be made within the scope of the appended claims without departure from the spirit of the invention.

Having thus described the invention, what is claimed as new and desired to secure by Letters Patent is:

1. An insecticide container comprising an elongated housing having a continuous inner-wall surface forming a complete circuit, said wall surface having at its outer ends edges defining openings, said housing having a length relatively large as compared to its cross-sectional dimensions and thereby providing a region at its central interior that is relatively dark, thereby to simulate a hiding place for a crawling insect, each of said openings having for a substantial distance inwardly from the aforementioned edges reinforcing and thickening means whereby the total thickness of the continuous wall of the housing and for a substantial distance inwardly thereof is greater than the thickness of said housing wall in the central portion thereof, an insecticide upon the central inner-wall surface of said housing and being in the form of a coating applied thereto, said insecticide covering an area of said inner-wall surface that is spaced inwardly from the inner ends of said reinforcing and thickening means, thereby to provide portions of said inner-wall surface intervening the inner ends of said reinforcing and thickening means and said area and onto which spread of said insecticide, if it partakes of movement, may first take place to be ultimately barred by the inner ends of said reinforcing and thickening means.

2. An insect exterminator formed of a blank, said blank having tabs at the opposite ends thereof and creased formations, certain of said creased formations defining the lines of transverse folds and others defining the lines of longitudinal folds, said blank having tube-like form in that it is folded along said lines of longitudinal folds and said blank being folded inwardly along said lines of transverse folds thereby to provide at its ends ridges, said blank having a flap at one longitudinal edge, and an insecticide on the inner surface within an area thereof that is spaced inwardly from said ridges thereby to provide a free surface between said area and said ridges, and means coacting with said longitudinal flap to hold said blank in said tube-like form.

3. A device of the character described comprising a tube-like housing, said housing being open-ended and of substantial length as compared to its cross-sectional dimensions and having a dark interior, a safety terminal at each end of said housing and providing means overlying end portions of the inner faces of said housing, a poisonous substance within said housing covering a portion of the inner faces of said housing and which portion has bounding lines spaced substantially from the inner ends of said overlying means, thereby to leave free areas of said inner faces intervening said poisonous substance and the inner ends of said safety terminals, whereby said substance, if it partakes of flow, must first spread lengthwise of said free spaces before reaching said safety terminals, said overlying means of the latter providing a ridge at each safety terminal at the inner end thereof to cause the poisonous substance to tend to spread laterally of said intervening areas and to resist overflow thereof onto said overlying means of the safety terminals and to the exterior of the housing.

4. A roach run simulating a dark hiding place comprising a tube-like housing made of sheet material conformed to and held in tube-like shape and having cross-sectional dimensions that are relatively small as compared to the length of said housing thereby to give the central portion of the interior of said housing comparative darkness which, in conjunction with the length of the housing and its relatively small cross-sectional dimensions provides a simulation of natural hiding places for roaches, said housing being open-ended and positionable on surfaces along which roaches travel, said housing bearing on the interior surface of its sheet material a layer-like coating of insecticide and the bounding lines of which coating are spaced inwardly from the open ends of said housing, and a safety terminal in each end of the housing, each safety terminal comprising sheet material laid against inner surface portions of the housing and extending ingwardly thereof for a substantial distance and having those surfaces thereof that are exposed to the interior of the housing free from said insecticide, thereby to restrict access to said insecticide by way of the open ends of said housing substantially only to insects capable of crawling into the housing and past the inner end of the said safety terminal, the inner end of the safety terminal presenting substantially an edge forming a barrier to movement, as by flow, of the insecticide onto said surfaces of the safety terminal.

5. A device of the character described, comprising a tube-like housing, said housing having at least one end open to provide an entry and being of substantial length as compared to its cross-sectional dimensions and having a relatively dark interior, a safety terminal at said open end of said housing and providing means overlying end portions of the inner face of said housing, a poisonous substance within said housing covering a portion of the inner face of the housing and which portion has a bounding line spaced substantially from the inner end of said overlying means, thereby to leave a free area of said inner face intervening said poisonous substance and the inner end of said overlying means, whereby said substance, if it partakes of flow, must first spread lengthwise of said free space before reaching said safety terminal, said overlying means of the latter providing a ridge at the inner end thereof to resist overflow thereof onto said overlying means of said safety terminal and to the exterior of the housing.

ALEX WEIL.